United States Patent Office 3,567,732
Patented Mar. 2, 1971

3,567,732
PROCESS FOR THE PREPARATION OF
CHLORINATED QUINOLINES
Robert Joly, Montmorency, Julien Warnant, Neuilly-sur-Seine, and Bernard Goffinet, Paris, France, assignors to Roussel-UCLAF, Paris, France
No Drawing. Filed Jan. 8, 1968, Ser. No. 696,135
Claims priority, application France, Jan. 10, 1967, 90,543
Int. Cl. C07d 33/14
U.S. Cl. 260—283                                    1 Claim

ABSTRACT OF THE DISCLOSURE

This invention relates to a process for the preparation of chlorinated quinolines of the formula

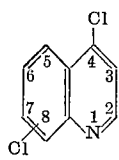

wherein the chlorine attached to the benzene nucleus is in a position selected from the group consisting of the 5, 6, 7 and 8 positions. The said process involves reacting a 2, 3 or 4-chloroaniline with a compound selected from the group consisting of β-propiolactone and a compound of the formula

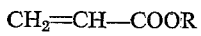
CH₂=CH—COOR wherein R is selected from the group consisting of hydrogen and lower alkyl, cyclizing the 3-(chloroanilino)-propionic acid formed with polyphosphoric acid, chlorinating the resulting 5, 6, 7 or 8-chloro-4-oxo-1,2,3,4-tetrahydroquinoline with phosphorus oxychloride and recovering said chlorinated quinoline. The dichloroquinolines are known products useful as intermediates in the production of known compounds having therapeutic activity.

THE PRIOR ART

Numerous processes for the preparation of dichloroquinolines of the above general formula are known.

But until now, the most commonly used processes involve 4 or 5 separate chemical reactions, necssitating often the heating to high temperatures of the order of 250° C., either for the cyclization of the nitrogenous nucleus, or for the decarboxylation of carbethoxy-4-hydroxyquinoline, which may be intermediately obtained.

According to some of these processes, it was necessary to effect a condensation of β-propiolactone with chloroanilines in acetone or acetonitrile by refluxing the solvent.

The introduction of the chlorine atom in 4-position, so as to obtain the desired dichloroquinolines of the above formula was most commonly effected by reacting phosphorus oxychloride with the corresponding 4-hydroxychloroquinoline, that is, a molecule having already a tertiary endocyclic nitrogen (see for example for these processes: J.A.C.S. 68 (1946) p. 113, 1204; J.A.C.S. 71 (1949) p. 1901; J.A.C.S. 73 (1951) p. 3168; J.A.C.S. 74 (1952) p. 5889; Chem. Ber. (1958) p. 499, etc.).

All these processes are somewhat inconvenient and difficult to apply industrially.

OBJECTS OF THE INVENTION

An object of the present invention is to develop a simple and economical method for the production of dichloroquinolines.

Another object of the present invention is the development of a process for the production of a dichloroquinoline of the formula

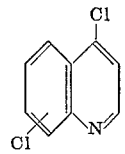

where the chlorine attached to the benzene nucleus is in a position selected from the group consisting of the 5, 6, 7 and 8 positions which comprises the steps of (A) condensing a chloroaniline selected from the group consisting of 2-chloroaniline, 3-chloroaniline and 4-chloroaniline with a compound selected from the group consisting of β-propiolactone, acrylic acid and a lower alkyl acrylate, (B) cyclizing the resulting 3-(chloroanilino)-propionic acid selected from the group consisting of 3-(2'-chloroanilino)-propionic acid, 3-(3'-chloroanilino)-propionic acid and 3-(4'-chloroanilino)-propionic acid by the action of polyphosphoric acid, (C) chlorinating the resulting chloro-4-oxo-1,2,3,4-tetrahydroquinoline of the formula

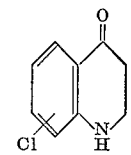

wherein the chlorine attached to the benzene nucleus is in a position selected from the group consisting of the 5, 6, 7 and 8 positions, by the action of phosphorus oxychloride, and (D) recovering said dichloroquinoline.

A further object of the invention is the obtention of the novel intermediates (a) 3-(3'-chloroanilino)-propionic acid
(b) Ethyl 3-(3'-chloroanilino)-propionate
(c) 4-oxo-8-chloro-1,2,3,4-tetrahydroquinoline.

These and other objects of the present invention will become more apparent as the description thereof proceeds.

DESCRIPTION OF THE INVENTION

These objects have been achieved in the development of a new process for the preparation of dichloroquinolines of the general Formula I:

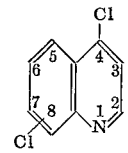
(I)

wherein the chlorine atom attached to the benzene nucleus is in 5-, 6-, 7- or 8-positions.

These dichloroquinolines are particularly useful as intermediates in the synthesis of certain chemical compounds, which are endowed with an important therapeutical activity.

Thus, for example, 4,7-dichloroquinoline is an intermediate in the preparation of 7-chloro-4 - (4'-diethylamino-1'-methyl - butylamino) - quinoline (or chloroquine) [see Surrey et al., J.A.C.S. 68 (1946) 113] and of 7-chloro-4-(3'-diethylamino-methyl-4'-hydroxy-phenylamino)-quinoline (or camoquine) [see Burkhalter et al., J.A.C.S. 70 (1948) 1363], these compounds being very active anti-materials. 4,7-dichlorquinoline is also a convenient intermediate for the synthesis of the α-monoglyceride of 4-(2'-carboxyphenylamino)-7 - chloroquinoline, which is a very efficient anti-inflammatory and particularly analgesic agent (see French Pat. 1,421,229).

4,8-dichloroquinoline is an intermediate in the synthesis of the α-mono-glyceride of 4-(2'-carboxyphenylamino)-8-chloroquinoline, which is endowed with an important analgesic effect as well as with a noteworthy anti-inflammatory effect (see French Pat. 4,488 M).

Now, the process of the invention for the preparation of the dichloroquinolines of the Formula I, is easy. It comprises only three main chemical reactions, so as to pass from the usual starting material, such as chloroanilines and β-propiolactone, acrylic acid or an alkyl acrylate, to the desired dichloroquinoline. Moreover, this process is not dangerous and is easy to industrialize.

The new process for the preparation of the dichloroquinolines of Formula I, which is the object of the invention, comprises three essential phases:

(a) the condensation of a chloroaniline with β-propiolactone, acrylic acid or an alkyl acrylate,
(b) the cyclization of the formed 3-(chloroanilino)-propionic acid by means of a polyphosphoric acid, and
(c) the chlorination with phosphorus oxychloride of the resulting 4-oxo-chloro-1,2,3,4-tetrahydroquinoline.

The said process, which is the object of the invention, is endowed with an unexpected, non-obvious and industrially advantageous character.

Thus, the condensation of acrylic acid with a chloroaniline is an unexpected reaction, which had not been anticipated until now.

This condensation is effected in water and at ordinary temperature, this being furthermore very advantageous and easy.

The condensation of a chloroaniline with β-propiolactone is effected in water and at room temperature, whereas the condensations of the β-propiolactone and chloroanilines, which have been previously described, were effected in acetone or acetonitrile, by refluxing the solvent.

By the process of the invention, the condensation becomes very easy and extremely economical, an advantageous from industrial point of view.

On the other hand, the chlorination of the 4-oxochloro-1,2,3,4-tetrahydroquinoline with phosphorus oxychloride is also a novel reaction with unexpected effects, since it simultaneously enables the introduction of the chlorine atom in the 4 position and the importation to the nitrogenous nucleus of an aromatic character, whereby additional technical advantages are obtained.

The new process for the preparation of the compounds of the Formula I, the object of the invention, is illustrated by the flow diagram of the table.

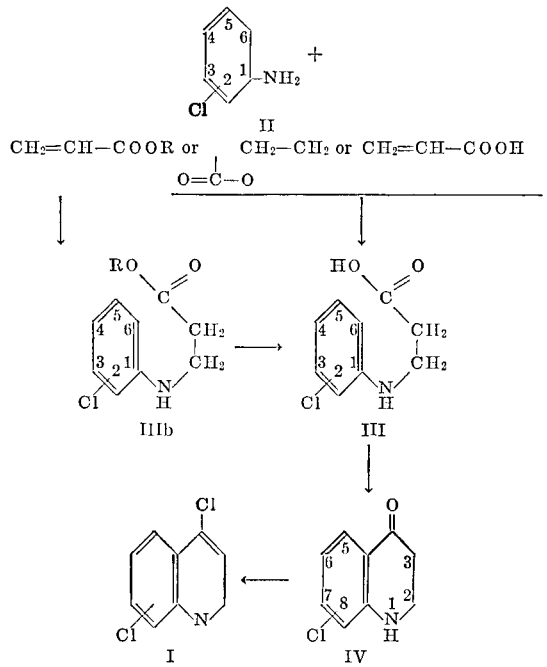

This process comprises mainly the condensation of a n-chloroaniline of the Formula II (with $n=2$ or 3 or 4) with β-propiolactone or an acrylic compound of the formula $CH_2=CH-COOR'$, wherein R' is selected from the group consisting of hydrogen and lower alkyl; the reaction, when R' represents a lower alkyl radical, of the formed lower alkyl 3 - (n-chloroanilino))-propionate of the Formula IIIb with an alkaline agent; the cyclization with a polyphosphoric acid of the resulting 3-(n-chloroanilino)-propionic acid of Formula III; to obtain the 4-oxo-q-chloro-1,2,3,4-tetrahydroquinoline of the Formula IV (with $q=5$ or 6 or 7 or 8) which is reacted with a chlorination agent, so as to obtain the desired 4,q-dichloroquinoline of the Formula I.

Later on, the letters $n$ and $q$ retain the definition given herein before.

The condensation of β-propiolactone or of acrylic acid with n-chloroaniline is effected in a polar solvent. It is convenient to effect the condensations in aqueous medium and about at the room temperature.

When a lower alkyl acrylate, for example, ethyl acrylate, is used instead of the free acid, the condensation with the n-chloroaniline is effected in a polar solvent, but the solvent used is preferably an organic carboxylic acid such as acetic acid, which enables a certain miscibility of the two reagents. Then, the lower alkyl 3-(n-chloroanilino)-propionate is thereafter saponified with an alkaline agent, in a polar solvent, for example, with an alkali-metal hydroxide in hydroalcoholic medium.

The polyphosphoric acid used to effect the cyclization of the 3-(n-chloranilino)-propionic acid is prepared by introducing, with agitation, into pure phosphoric acid, which is heated to about 100° C., such an amount of phosphoric acid anhydride that the $P_2O_5$ content of the polyphosphoric acid lies between 80 and 90% by weight and preferably near to 85% by weight.

Then the cyclization of the 3-(n-chloranilino)-propionic acid is effected at about 100° C., by introducing the 3-(n-chloroanilino) - propionic acid into the polyphosphoric acid with agitation. The reaction is completed by heating for a short period of time.

In the case of 3 - (3' - chloroanilino) - propionic acid, the cyclization is effected in two different manners, using either one or the other of the two carbons adjacent to the point of attachment of the benzene cycle and of the carboxyethylamino chain. It results therefrom, and it is an advantage of the process of the invention, that by cyclizing 3 - (3' - chloroanilino) - propionic acid with a polyphosphoric acid, there is obtained, in addition to the 4-oxo-7-chloro-1,2,3,4 - tetrahydroquinoline, 4 - oxo - 5-chloro-1, 2,3,4-tetrahydroquinoline, which after separation from its isomer by chromatography, is thereafter converted into 4,5-dichloroquinoline by chlorination.

The chlorination agent, used to convert the 4-oxo-q-chloro - 1,2,3,4 - tetrahydroquinolines into 4,q - dichloroquinoline, is preferably phosphorus oxychloride, and it is advantageously proceeded in the presence of either a mineral halogenated derivative, selected from the group consisting in cuprous chloride, cupric chloride, ferrous chloride, ferric chloride, phosphorus pentachloride and phosphorus trichloride, or iodine. It has been found that iodine gives the most interesting results. A mixture of 3 volumes of phosphorus oxychloride and 0.5 mol of iodine is conviently used to effect the chlorination of a mol of the 4-oxo-q-chloro-1,2,3,4-tetrahydroquinoline.

The following examples illustrate the invention, without giving it any limitative character.

EXAMPLE I.—4,8-DICHLOROQUINOLINE

Step 1.—(A) Obtention of 3-(2'-chloroanilino)-propionic acid

First variant.—By using β-propiolactone: 100 g. of 2-chloroaniline, 100 cc of water and 68 g. of β-propiolactone are mixed with agitation. The agitation is maintained for twenty-four hours at room temperature. Then 100 cc. of isopropyl are admixed and the reaction mixture is agitated. The precipitate is filtered with suction, washed with water, with isopropyl ether, and dried.

150 g. of 3 - (2' - chloroanilino) - propionic acid are thus obtained having a melting point of 138° C.

This product exhibits the following properties:

Acid number: 280±3 mg. KOH/1 g. (theory: 280)
Nitrogen content: 7.0±0.2% by weight (theory: 7.0)
Chlorine content: 17.7±0.2% by weight (theory: 17.7)

This product is used as such for the next step.

(B) Obtention of 3-(2'-chloranilino-propionic acid

Second variant.—By using acrylic acid: 100 g. of 2-chloroaniline, 100 cc. of water and 113 g. of acrylic acid are mixed with agitation. The agitation is maintained for forty-eight hours at room temperature. Thereafter, the precipitate is filtered with suction, washed with water and dried to obtain thus 144 g. of 3-(2'-chloroanilino)-propionic acid.

Step 2.—Obtention of 4-oxo-8-chloro-1,2,3,4-tetrahydroquinoline 2.112 kg. of crystallized phosphoric acid, containing 99% of $H_3PO_4$, are heated to 100° C. 1.888 kg. of phosphoric acid anhydride is added thereto in a regular manner over about two hours, without exceeding a temperature of 120° C. The mixture is agitated for one hour at 100–110° C. to obtain then 4 kg. of polyphosphoric acid containing 85% of $P_2O_5$.

0.500 kg. of 3 - (2 - chloroanilino) - propionic acid is added over a period of about five minutes to the thus obtained polyphosphoric acid, while slowly agitating at 100° C. The reaction mixture is then agitated for about three hours at 100° C. The reaction solution is poured over a period of about one hour into 25 litres of water. The mixture is agitated for two hours at room temperature and left to stand for fifteen hours. The precipitate formed is filtered with suction, washed with water, then with an aqueous solution of ammonia and finally with water, to obtain thus 0.360 kg. of crude 4 - oxo - 8 - chloro-1,2,3,4-tetrahydroquinoline having a melting point of 72° C., which is used as such for the next step.

By crystallizing from isopropanol, there is obtained a product which melts at 75° C.

Analysis.—$C_9H_8ClNO$ (percent): molecular weight =181.6. Calculated for C, 59.52; H, 4.44; N, 7.71; Cl, 19.52. Found (percent): C, 59.5; H, 4.6; N, 7.5; Cl, 19.5.

As far as is known, this product is not described in the literature.

Step 3.—Obtention of 4,8-dichloroquinoline 7 g. of iodine are introduced into 30 cc. of phosphorus oxychloride, and the mixture is heated to 85° to 90° C. with agitation. This temperature is maintained for about thirty minutes. A solution of 10 g. of 4-oxo-8-chloro-1,2,3,4-tetrahydroquinoline (M.P.=75° C.) in 40 cc. of dichloroethane is introduced in a regular fashion over a period of about one hour at 85° to 90° C. The mixture is agitated further for two hours at 85° to 90° C., and then the dichloroethane is distilled off under normal pressure. The obtained solution is poured into a mixture consisting of an aqueous solution of ammonia, ice and sodium metabisulfite and agitated for two hours. The precipitate formed is filtered with suction, washed with water, dried, to obtain 9.5 g. of 4,8-dichloroquinoline, having a melting point of 157° C.

A sample of this product, crystallized from ethanol, has a melting point of 157 °C. and is identical with an otherwise prepared sample.

By using the crude 4-oxo-8-chloro-1,2,3,4-tetrahydroquinoline (M.P.=72° C.) there are obtained 8.65 g. of 4,8-dichloroquinoline having a melting point of 157° C.

EXAMPLE II.—4,7-DICHLOROQUINOLINE

Step 1.—Ethyl 3-(3'-chloroanilino)-propionate 500 g. of 3-chloroaniline, 50 cc. of acetic acid and 425 cc. of ethyl acrylate are mixed in an inert atmosphere. The mixture is heated to 100° C., and this temperature is maintained with agitation for seventy two hours. The unreacted ethyl acrylate is distilled under reduced pressure, then the residue is rectified under a vacuum of the order of 2 mm. of mercury, to obtain thus 670 g. of ethyl 3-(3'-chloroanilino)-propionate, B.P. 2 mm.=150°–152° C.

This product is used as such for the next step.

A sample of this product, purified by crystallization from ispropyl ether, has a melting point of 34° C.

Analysis.—Calculated for $C_{11}H_{14}ClNO_2$ (percent): molecular weight=227.68. C, 58.02; H, 6.2; N, 6.15; Cl, 15.57. Found (percent): C, 58.1; H, 6.1; N, 6.4; Cl, 15.9.

As far as is known, this product is not described in the literature.

Step 2.—3-(3'-chloroanilino)-propionic acid 500 g. of ethyl 3-(3'-chloroanilino)-propionate are introduced into 1000 cc. of methanol. Then the mixture is admixed over a period of about thirty minutes at room temperature with 242 cc. of 10 N aqueous solution of sodium hydroxide and agitated for fifteen hours at room temperature. The methanol is distilled off under reduced pressure, whil adding simultaneously and progressively about 1000 cc. of water. The obtained solution is extracted with ethyl ether, then its pH is brought to 3.5 by adding a 22° Bé aqueous solution of hydrochloric acid. The acid aqueous phase is extracted with methylene chloride. The extracts are combined, and the obtained organic solution is washed with water, dried and concentrated to dryness under reduced pressure, to obtain 436 g. of crude 3-(3'-chloroanilino)-propionic acid, which is used as such for the next step.

A sample of this product, crystallized from an isopropyl ether-petroleum ether mixture (B.P.=65°–75° C.) has a melting point of 42° C.

Analysis.—Calculated for $C_9H_{10}ClNO_2$ (percent): molecular weight=199.63. C, 54.15; C, 5.04; N, 7.01; Cl, 17.76. Found (percent): C, 54,4; C, 5.2; N, 6.7; Cl, 17.9.

As far as is known, this product is not described in the literature.

Step 3.—4-oxo-7-chloro-1,2,3,4-tetrahydroquinoline

Starting from 250 g. of 3-(3'-chloroanilino)-propionic acid, and by applying a method similar to that used in the stage 2 Example 1 of the preparation of 4,8-dichloroquonoline, there are obtained 177 g. of a crude product containing, in addition to the 7-chlorinated derivative, 4-oxo-5-chloro-1,2,3,4-tetrahydroquinoline.

This crude product is purified by chromatography through magnesium silicate with elution with methylene chloride, then by crystallization from isopropanol to obtain 88.5 g. of pure 4 - oxo-7-chloro-1,2,3,4-tetrahydroquinoline, having a melting point of 135° C.

Analysis.—Calculated for $C_9H_8ClNO$ (percent): molecular weight=181.62. C, 59.52; H, 4.44; N, 7.71; Cl, 19.52. Found (percent): C, 59.6; H, 4.5; N, 7.4; Cl, 19.3.

U.V. spectrum (ethanol):
  max. at 238 m$\mu$ ($\epsilon$=27,800)
  max. at 265 m$\mu$ ($\epsilon$=9,050)
  max. at 376 m$\mu$ ($\epsilon$=4,700)

Next, by eluting the two columns with a mixture of methylene chloride containing 5% o facetone, and purifying the residue, which is obtained after evaporation of the solvent, by crystallization from isopropanol, there is obtained 4-oxo-5-chloro-1,2,3,4-tetrahydroquinoline having a melting point of 132° C.

*Analysis.*—Calculated for $C_9H_8ClNO$ (percent): molecular weight=181.62. C, 59.52; H, 4.44; N, 7.71; Cl, 19.52. Found (percent): C, 59.8; H, 4,5; N, 7.5; Cl, 19.8.

U.V. spectrum( ethanol):
max. at 245 m$\mu$ ($\epsilon$=18,900)
max. at 383 m$\mu$ ($\epsilon$=4,080)

Step 4.—4,7-dichloroquinoline

Starting from 10 g. of 4-oxo-7-chloro-1,2,3,4-tetrahydroquinoline, and by applying a method similar to that used in the step 3 of Example 1 of the preparation of 4,8-dichloroquinoline, there is obtained a crude product, which after purification by chromatography through magnesium silicate, then crystallization from isopropyl ether, gives 7.5 g. of 4,7-dichloroquinoline, having a melting point of 85° C.

This product is identical with an otherwise prepared sample.

When treated in a similar manner, the 4-oxo-5-chloro-1,2,3,4-tetrahydroquinoline leads to 4,5-dichloroquinoline, which has a melting point of 116°– 117° C. and is identical with an otherwise prepared sample.

EXAMPLE III.—4,6-DICHLOROQUINOLINE

Step 1.—3-(4'-chloroanilino)-propionic acid

Starting from 80 g. of 4-chloroaniline, and applying a method similar to that used in procedure B of step 1 of Example 1, for the preparation of the 4,8-dichloroquinoline, but without adding isopropyl ether prior to the final filtering with suction, there are obtained 125 g. of 3-(4'-chloroanilino)-propionic acid, which is purified by crystallization from ethyl acetate, to give 96 g. of 3-(4'-chloroanilino)-propionic acid, having a melting point of 125° C, used as such in the next step.

A sample of this product, crystallized from ethyl acetate, has a melting point of 125° C.

*Analysis.*— Calculated for $C_9H_{10}O_2NCl$ (percent): molecular weight=199.62. C, 54.15; H, 5.04; N, 7.01; Cl, 17.76. Found (percent): C, 54.0; H, 5.3; N, 7.0; Cl, 17.6.

Step 2.—4-oxo-6-chloro-1,2,3,4-tetrahydroquinoline

Starting from 50 g. of 3-(4'-chloroanilino)-propionic acid, and by applying a method similar to that used in step 2 of Example 1, for the preparation of 4,8-dichloroquinoline, there are obtained 30 g. of crude product, which after crystallization from methanol, gives 25 g. of pure 4-oxo-6-chloro-1,2,3,4-tetrahydroquinoline, having a melting point of 126° C.

A sample of this product, purified by recrystallization from methanol, has a melting point of 126° C.

*Analysis.*—Calculated for $C_9H_8ClNO$ (percent): molecular weight=181.62. C, 59.51; H, 4.44; N, 7.71; Cl, 19.52. Found (percent): C, 59.6; H, 4.7; N, 7.9; Cl, 19.6.

Step 3.—4,6-dichloroquinoline 15 g. of 4-oxo-6-chloro-1,2,3,4-tetrahydroquinoline are treated with phosphorus oxychloride and iodine in a manner similar to that used in step 3 of Example 1, for the preparation of the 4,8-dichloroquinoline. After agitation for two hours at 85° C., the reaction mixture is poured into a mixture consisting of an aqueous solution of ammonia, ice and sodium metabisulfite. The whole is agitated and the aqueous phase extracted with methylene chloride. The extracts are combined and the organic solution, which is obtained, is washed with water, dried and concentrated to dryness under reduced pressure.

The residue is purified by chromatography through magnesium silicate and there are thus obtained 10 g. of 4,6-dichloroquinoline, having a melting point of 106° C.

This product is identical with an otherwise obtained sample.

The preceding specific embodiments are illustrative of the practice of the invention. It is to be understood, however, that other expedients known to those skilled in the art, can be employed without departing from the spirit of the invention or the scope of the appended claims.

We claim:
1. A process for the production of a dichloroquinoline of the formula

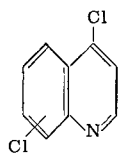

where the chlorine attached to the benzene nucleus is in a position selected from the group consisting of the 5, 6, 7 and 8 positions which comprises the steps of chlorinating a chloro-4-oxo-1,2,3,4-tetrahydroquinoline of the formula

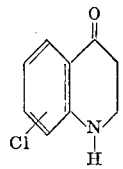

wherein the chlorine attached to the benzene nucleus is in a position selected from the group consisting of the 5, 6, 7 and 8 positions, by the action of phosphorus oxychloride in the presence of a compound selected from the group consisting of iodine, cuprous chloride, cupric chloride, ferrous chloride, phosphorus trichloride and phosphorus pentachloride, and recovering said dichloroquinoline.

References Cited
UNITED STATES PATENTS

| | | | |
|---|---|---|---|
| 3,362,954 | 1/1968 | Surrey | 260—287X |
| 2,558,211 | 6/1951 | Elderfield | 260—289 |
| 2,520,043 | 8/1950 | Lisk | 260—283 |
| 2,579,320 | 12/1951 | Hultquist | 260—283 |
| 2,691,023 | 10/1954 | Horlein | 260—283X |
| 2,701,252 | 1/1955 | Vollmann | 260—694X |
| 3,113,132 | 12/1963 | Baxter | 260—694 |
| 3,397,208 | 8/1968 | Berman | 260—287 |

OTHER REFERENCES

Drukker et al.: Abstracted in Chem. Abstr., vol. 65, Co. 20096 (1966).

DONALD G. DAW, Primary Examiner

U.S. Cl. X.R.

260—289, 471, 511, 694